(No Model.)
T. HILL.
DUMPING CART.
No. 328,219. Patented Oct. 13, 1885.
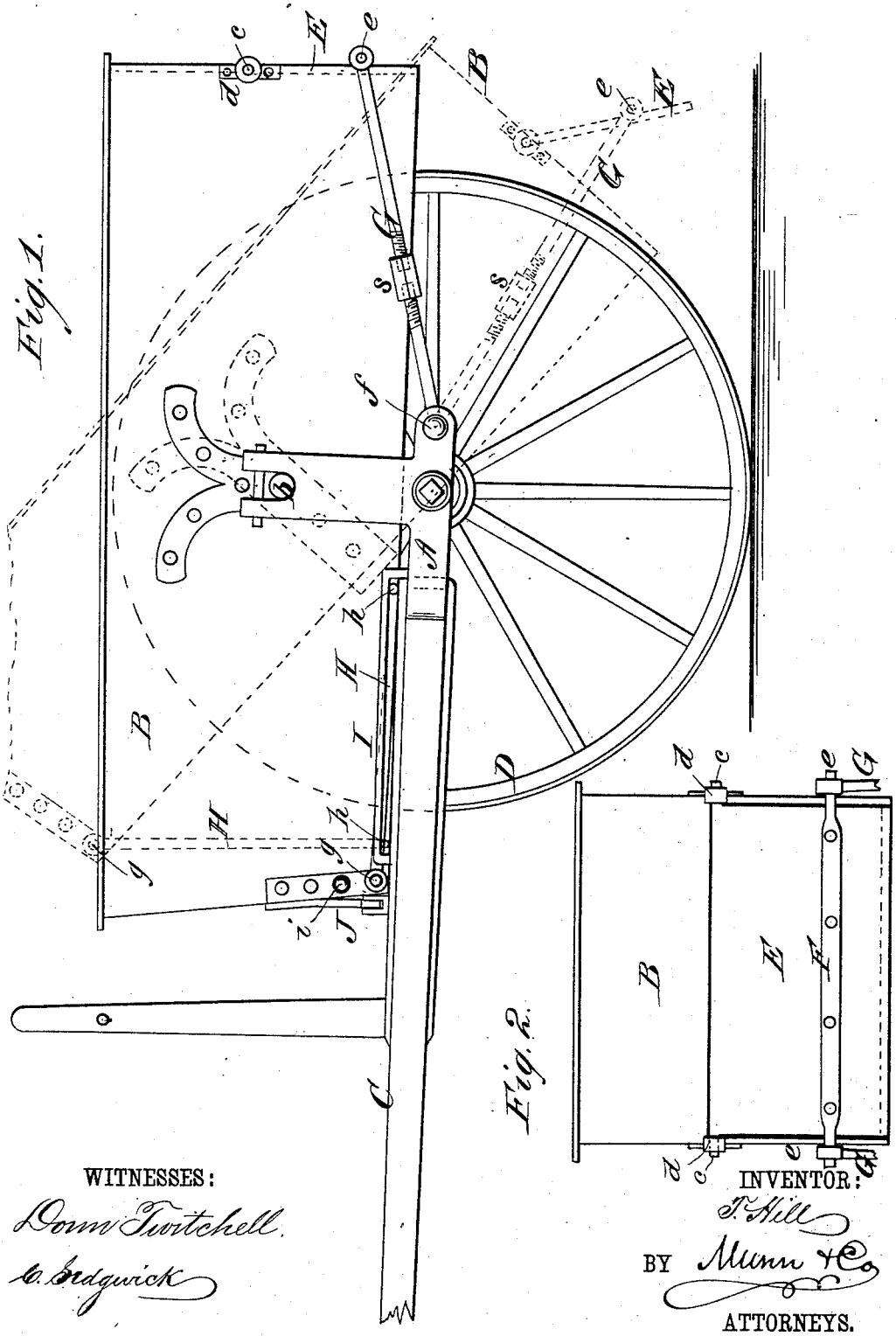
WITNESSES:
Donn Twitchell
C. Sedgwick
INVENTOR:
T. Hill
BY Munn & Co.
ATTORNEYS.

UNITED STATES PATENT OFFICE.

THOMAS HILL, OF JERSEY CITY, NEW JERSEY.

DUMPING-CART.

SPECIFICATION forming part of Letters Patent No. 328,219, dated October 13, 1885.

Application filed November 20, 1884. Serial No. 148,395. (No model.)

*To all whom it may concern:*

Be it known that I, THOMAS HILL, of Jersey City, in the county of Hudson and State of New Jersey, have invented certain new and useful Improvements in Dumping Carts and Wagons, of which the following is a full, clear, and exact description.

This invention relates to dumping carts or wagons of different kinds, made either of wood or metal, and which are provided with tail-boards for discharging their load either directly or through a chute into hatchways, receiving-vaults, or other contracted openings, or wherever it may be required to deliver the load. Ordinarily, with tail-board dumping carts or wagons much time and labor is consumed in removing or opening the tail-board in order to dump the load, and in replacing or closing the tail-board after dumping.

My invention consists in a tail-board dumping cart or wagon in which the tail-board has combined with it and the axle or fixed frame-work connected with the axle and carrying the tilting box or body of the wagon, radius rods or pivoted connections, whereby on raising the front end of the body of the vehicle and depressing its rear end the tail-board will be automatically opened to dump the load, and will be automatically closed and held closed on returning the box or body to its normal position, thus saving much time and labor, and dispensing with all necessity on part of the driver to touch or separately manipulate the tail-board.

The invention also comprises means whereby the driver is enabled to tilt the box or body of the vehicle to discharge its load without its coming in contact with the ground, thus saving labor and wear and tear of the vehicle, and holding the box or body in its dumping position, with facility for its returning to its normal or loading position, when required, substantially as hereinafter described.

Reference is to be had to the accompanying drawings, forming part of this specification, in which similar letters of reference indicate corresponding parts in both the figures.

Figure 1 represents a side elevation of a tail-board dumping cart or wagon embodying my invention with the near wheel removed, showing the vehicle in its normal or loading position by full lines and in its dumping position by dotted lines. Fig. 2 is a rear end view of the body of the vehicle when its tail-board is closed.

A is a cranked axle, forming also the fixed frame-work, which carries, as by a trunnion, $b$, on opposite sides of the vehicle, the dumping box or body B. Said fixed frame-work may be variously constructed, and the axle need not necessarily be a cranked one.

C is one of the shafts of the vehicle, and D its off wheel.

The box or body B may be variously shaped, and is provided with a pivoted tail-board, E. Said tail-board, which may be made to either partially or wholly open the body of the wagon in the rear, and be detachable or not, as desired, may have its pivots $c$, on or by which it swings, fitted to rock or work in boxes $d$, secured to the sides of the body in its rear.

Extending lengthwise across and secured to the tail-board at a suitable distance from the pivots $c$ is a bar, F, forming pivots or stud-bearings $e$ on its opposite ends, and connecting these pivots $e$ with the fixed frame-work A or axle of the vehicle, or other fixed portion thereof in vicinity to the axle, are pivoted radii or connecting rods G. These rods are so arranged in relation to the parts to which they are attached and in such eccentric positions at their inner pivots or joints, $f$, relatively to the trunnions $b$ of the box or body B, that on the driver's lifting the front end of said body to dump the load, the tail-board E will be automatically thrown open by reason of the increased distance which the outer ends of the rods G will then occupy from the trunnions $b$, as shown by dotted lines in Fig. 1. When, however, the body B is returned to its normal or loaded position again, and secured, as by a fastening, J, of any suitable construction, the rods G will hold the tail-board E closed, as shown by full lines in Fig. 1. In this way the tail-board will be automatically opened and closed every time the driver tilts the body to dump the load, and to put the vehicle into a receiving or carrying condition again with the tail-board automatically held closed.

The rods G are each divided into separate lengths, and the divided portions coupled by a screw box or nut, $s$, whereby the length of said rods may be adjusted to secure the perfect closing of the tail-board.

To facilitate the driver's throwing up the box or body of the vehicle in front by a handle, i, or otherwise to a suitable height, and no further, in order to dump the load without bringing the rear end of the body in contact with the ground, a rod, H, is pivoted at its one end, g, to the lower portion of the body B, in front on the side thereof, and the other end, h, of said rod fitted to slide in and along a fixed guide or guideway, I, upon the shafts or other fixed frame-work of the vehicle back of the forward end of the body, so that on throwing up the body in front the rod H will have its end h drawn along the guideway and be made to assume a vertical or locking position, to hold the body at its proper dumping angle and with its delivery end out of contact with the ground, as shown by dotted lines in Fig. 1. This will save much labor, and reduce wear and tear of the cart or wagon.

It will be observed that the tail-board is of the ordinary construction, and that the wagon may be used in the ordinary manner when required—that is to say, without calling into requisition the radius rods. For this purpose all that is needed is to press outward the extremities of the rods G, so as to slip them off from their pivots on the ends of the cross-bar F. The same result can be effected by unscrewing the nuts s, so as to separate the parts of the rods G. When the rods G are thus separated from the tail-board, the latter then becomes an ordinary wagon tail-board, and may be operated as such, being locked by any of the usual fastenings.

Having thus described my invention, what I claim as new, and desire to secure by Letters Patent, is—

1. In a dumping-cart, the box turning in stationary bearings b, the rods H, pivoted at one end to the front of the box, the ways I, secured to the shaft C, and the opposite ends of the rods pivoted so as to slide back and forth in these ways I, to limit the movement of the box in dumping, substantially as described.

2. In a dumping-cart, the combination, with a tail-board, E, hinged to the box B, the adjustable rods G, pivoted to the frame A at a point below the opposite ends, which are pivoted to the tail-board at e, constructed and operating so as to swing the tail-board upward as the box turns upon its stationary bearings b in dumping, substantially as described.

3. The combination, with the tail-board and the pivots e, of the rods G, when made in two parts and rendered adjustable by couplings s, as shown and described, for the purposes set forth.

THOMAS HILL.

Witnesses:
A. GREGORY,
C. SEDGWICK.